US012782302B2

(12) United States Patent
Heek et al.

(10) Patent No.: US 12,782,302 B2
(45) Date of Patent: Nov. 3, 2026

(54) HANDHELD X-RAY FLUORESCENCE, XRF, ANALYZER AND A METHOD FOR ELEMENTAL ANALYSIS WITH A HANDHELD XRF ANALYZER

(71) Applicant: Bruker Nano GmbH, Berlin (DE)

(72) Inventors: Tim Heek, Kranenburg (DE); Timo Wolff, Berlin (DE)

(73) Assignee: Bruker Nano GmbH, Berlin (DE)

( * ) Notice: Subject to any disclaimer, the term of this patent is extended or adjusted under 35 U.S.C. 154(b) by 260 days.

(21) Appl. No.: 18/916,359

(22) Filed: Oct. 15, 2024

(65) Prior Publication Data

US 2025/0172513 A1 May 29, 2025

(30) Foreign Application Priority Data

Nov. 29, 2023 (EP) .................................... 23213002

(51) Int. Cl.
*G01N 23/00* (2006.01)
*G01N 23/223* (2006.01)
*G21K 1/093* (2006.01)

(52) U.S. Cl.
CPC ........... *G01N 23/223* (2013.01); *G21K 1/093* (2013.01); *G01N 2223/301* (2013.01); *G01N 2223/316* (2013.01); *G01N 2223/507* (2013.01)

(58) Field of Classification Search
CPC ....... G01N 2223/301; G01N 2223/316; G01N 2223/507; G01N 23/223; G21K 1/093
See application file for complete search history.

(56) References Cited

U.S. PATENT DOCUMENTS

2018/0031497 A1* 2/2018 Parks .................. G01N 23/223
2022/0068635 A1 3/2022 Fragala et al.

FOREIGN PATENT DOCUMENTS

WO 2009082373 A1 7/2009

OTHER PUBLICATIONS

European Application No. 23213002.1 Extended European Search Report mailed Mar. 3, 2022, 7 pages.
Valle Brozas F et al: "Laser-based X-ray and electron source ror X-ray fluorescence studies", Applied Physics B, Springer Berlin Heidelberg, Berlin/Heidelberg, vol. 122, No. 8, Jul. 26, 2016 (Jul. 26, 2016), pp. 1-7, XP036015307, ISSN: 0946-2171, DOI: 10.1007/S00340-016-6494-9.

(Continued)

*Primary Examiner* — Dani Fox
(74) *Attorney, Agent, or Firm* — MagStone Law, LLP; Enshan Hong

(57) ABSTRACT

The present disclosure refers to a handheld X-ray fluorescence, XRF, analyzer (1). The XRF analyzer (1) comprises a radiation source assembly (10) configured to irradiate a sample (40) to be tested with an X-ray beam (105), a radiation detector assembly (20) configured to detect a first X-Ray fluorescence, XRF, radiation (205) emitted from the sample (40) in response to the X-ray beam (105), a purge assembly configured for purging through a port connection, a magnet (30) configured to deflect electrons such that they do not reach the radiation detector assembly (20) and a processor configured to determine a property of the sample (40) to be tested from the first X-ray fluorescence, XRF, radiation (205). The present disclosure further refers to a method for elemental analysis with a handheld XRF analyzer (1).

20 Claims, 5 Drawing Sheets

(56) References Cited

OTHER PUBLICATIONS

Ioanna Mantouvalou et al: "3D Micro-XRF for Cultural Heritage Objects: New Analysis Strategies for the Investigation of the Dead Sea Scrolls", Analytical Chemistry, vol. 83, No. 16, Aug. 15, 2011(Aug. 15, 2011), pp. 6308-6315, XP055054009, ISSN: 0003-2700, DOI: 10.1021/ac2011262.

* cited by examiner

HANDHELD X-RAY FLUORESCENCE, XRF, ANALYZER AND A METHOD FOR ELEMENTAL ANALYSIS WITH A HANDHELD XRF ANALYZER

FIELD OF THE DISCLOSURE

The present invention relates to a handheld X-ray fluorescence (XRF) analyzer. The invention is further directed to a method for elemental analysis with a handheld XRF analyzer.

TECHNOLOGICAL BACKGROUND

X-ray fluorescence spectrometry, XRF, is widely used in scientific and commercial applications for non-destructive investigation of the composition of materials. Therein a target to be investigated is exposed to an incident beam of short-wavelength X-rays. In response to the incident beam the target emits element specific fluorescence radiation that can be used for analyzing the elemental composition of the target.

XRF describes the process where some high-energy radiation excites atoms by shooting out electrons from the innermost orbitals. When the atom relaxes, that is, when outer electrons fill inner shells, X-Ray fluorescence radiation is emitted. All this happens without touching or damaging the sample. In X-ray spectroscopy, energy-dispersive X-ray spectroscopy (EDXRF) and wavelength-dispersive X-ray spectroscopy (WDXRF) are two different commonly used methods for determining the material composition of a target using X-ray spectroscopy on the photon detection side. In both methods, the target is illuminated with an X-ray beam with enough energy to impact the electrons in the inner shells of the atoms in a sample and the X-rays emitted by the sample are detected with an X-ray detector. The individual fluorescent energies of the detected X-rays are specific to the elements that are present in the sample.

Particularly, in EDXRF the amount and energy of the emitted X-rays are resolved by an energy-dispersive spectrometer and the resulting EDXRF spectrum can be used to determine the elemental composition of the target. In WDXRF, the emitted X-rays are further diffracted by a crystal of known lattice to precisely identify the distribution of X-rays with a specific wavelength, thus allowing to identify the phases including the spatial orientation of the crystal lattices of the target's constituents.

There are many techniques derived from XRF. Some are very sensitive (TXRF), others very precise (WDXRF). Some for valuable, delicate objects that must stay untouched (Micro-XRF/Macro-XRF), others rather for materials used for and derived from industrial processes (Direct & Polarized EDXRF). Some give you the exact concentrations of all elements contained in the sample (WDXRF); others can tell you exactly where some inclusion is in the sample (Micro-XRF). Most are laboratory instruments; some can be carried around in one hand (Handheld-XRF).

In portable X-ray fluorescence spectrometers, for example, photoelectrons are generated which reach the detector. Under certain excitation parameters the background of the generated spectrum is significantly increased which in turn leads to higher limits of detection (LOD's).

A technical problem with X-ray fluorescence spectrometers and, consequently, portable X-ray fluorescence spectrometers, among others, is that due to gas purging and light-tight windows that allow only X-rays to pass through, the mean free path length of electrons, e.g. photoelectrons and auger-electrons, generated from the sample, for example, is so long that they reach the detector. This is usually not a problem with standing instruments (measuring medium air and beryllium windows), where the electrons are absorbed beforehand.

SUMMARY OF INVENTION

According to one aspect of the present disclosure, a handheld X-ray fluorescence, XRF, analyzer is provided. The XRF analyzer comprises a radiation source assembly configured to irradiate a sample to be tested with an X-ray beam, a radiation detector assembly configured to detect a first X-Ray fluorescence, XRF, radiation emitted from the sample in response to the X-ray beam, a purge assembly configured for purging through a port connection, a magnet configured to deflect electrons such that they do not reach the radiation detector assembly and a processor configured to determine a property of the sample to be tested from the first XRF radiation.

The X-ray beam is created by the radiation source assembly inside the handheld analyzer. The X-ray beam is then emitted from a front end of the handheld XRF analyzer. X-ray fluorescence emitted by the sample can be used to identify the element from which it emanates, because the amount of energy emitted in the fluorescence process is unique to each element. The interaction of the X-ray beam with the sample generates first X-Ray fluorescence, XRF, radiation. This is detected by the radiation detector assembly. The individual fluorescent energies detected are specific to the elements that are present in the sample. In order to determine the quantity of each element present, the proportion in which the individual energies appear can be calculated by the processor. Atmosphere will impact the results obtained in an XRF measurement, especially for light elements like F, Na, Mg, Al, Si, and P. Any material between the sample and detector will absorb some of the low-energy X-rays emitted by the sample before they arrive at the detector to be counted. Air is the standard atmosphere for measuring heavy metals in multiple matrices, heavy elements (Ti to U) in multiple matrices, and light elements (Mg to Zn) in heavy metal alloy matrices. To get the best signal for light elements, air needs to be removed between the sample and detector. This can be accomplished by purging with a suited gas through a port connection that significantly improves measurements for very light elements (F to P) in multiple matrices. The processor provides the ability to visualize, identify and analyze the relative elemental content of almost any substance. Preferably, the processor provides a project management database that contains hundreds of thousands of spectra and is organized in a logical structure for a given project. Users can contribute their own expertise to guide the analysis, while the processor applies the advanced mathematics of Bayesian analysis to the spectra. The results can be imported into any analysis program already in use.

The placement of the magnet according to the invention, preferably of a neodymium magnet, for handheld devices deflects the electrons emitted from the sample so that they do not reach the detector. If a particle (e.g. an electron) moves with the charge and the velocity through a magnetic field, then it experiences a magnetic force (Lorentz force). It is then deflected by the Lorentz force acting on itself. Accordingly, the invention achieves that electrons are deflected. It has been shown by the inventors in experiments and studies that the placement of the magnet reduces a higher background in the characteristic X-ray spectrum caused by the photoelectrons that can reach the detector, which are present under the given conditions. The arrangement of the magnet does not add artificial peaks that would disturb the spectrum.

According to one preferred embodiment, the magnet is disposed outside of a beam path of the X-ray beam and outside of a beam path of the first XRF radiation. Light is a very complicated phenomenon that can be described by different models. Since a model reflects only some characteristics or properties of an original in each case, each of the models has a specific range of application. The model (light) ray is a model for representing the path that light travels. It is mainly used when one wants to represent in a simple way the rectilinear propagation of light, the formation of shadows or the course of light during reflection and refraction. The model fails with such phenomena as diffraction, interference or polarization, which is tolerated in the present case. The same applies to X-rays, which are electromagnetic waves. In optics, a ray is an idealized geometrical model of light or other electromagnetic radiation, obtained by choosing a curve that is perpendicular to the wavefronts of the actual light, and that points in the direction of energy flow. Rays are used to model the propagation of light through an optical system, by dividing the real light field up into discrete rays that can be computationally propagated through the system by the techniques of ray tracing. When a radiation source emits light, this light always moves in a straight line (on a straight path). Such a path is also called a beam path or ray (see e.g. math: ray theorem). Since according to this embodiment, the magnet is disposed outside of a beam path of the X-ray beam and outside of a beam path of the first XRF radiation, any one of the two radiations is prevented from hitting it. This has the advantage that no additional interfering XRF radiation is generated from the magnet, which would influence the measurements and could affect a result.

According to a first preferred embodiment, the radiation source assembly comprises an X-ray source, preferably an X-ray tube, a collimator and a first aperture for the X-ray beam. Further, the radiation detector assembly preferably comprises a silicon drift detector, SDD, and a second aperture for the first XRF radiation in which a light element window, preferably a graphene window, is disposed. This provides an analyzer whose radiation source assembly forms a first separate assembly through whose first aperture the X-ray beams are precisely emitted. The second assembly, i.e., the radiation detector assembly, receives the first XRF radiation emitted from the sample in response to the X-ray beam through the second aperture. This provides a compact portable analyzer whose various elements are arranged in a space-saving manner relative to each other. By forming the two separate assemblies, they can be advantageously arranged and aligned to each other, while at the same time the magnet can be integrated separately and uninfluenced by the other assemblies. Especially in portable X-ray fluorescence spectrometers, with SDD detector and light element entrance window under gas purging, preferably helium purging, photoelectrons are generated which may reach the detector. Under certain excitation parameters, the background of the generated spectrum is significantly increased which in turn leads to higher limits of detection (LOD's). Thus, the arrangement and design according to the invention counteracts this disadvantage.

According to a preferred embodiment of the first preferred embodiment, the X-ray source, the collimator, and the first aperture are disposed along a first axis in said order, wherein the SDD and the second aperture are disposed along a second axis in said order and wherein the magnet is laterally spaced apart from the first axis and the second axis. Through this, the respective components of each of the assemblies are arranged along a respective axis, improving control of the radiation emitted or received. In addition, no redirections of the respective radiation are necessary, thus saving further installation space. Moreover, a reliable evaluation of the radiation patterns can be made and the magnet can be secured accordingly outside the axes representing the central axes of the emitted direction. This can ensure that the magnet is not hit by the corresponding radiation and thus no additional XRF radiation is generated that interferes with the measurement. At the same time, however, the electrons generated by the sample are deflected due to the magnetic field of the magnet and prevented from entering the radiation detector assembly.

In a further preferred embodiment of the first preferred embodiment, the collimator is adjustable to alter a beam width of the X-ray beam and the magnet is disposed outside of a beam path of the X-ray beam in at least one configuration of the adjustable collimator. Thus, an additional adjustment option is provided to help ensure that the magnet is not struck by the X-ray beam. If the beam width of the X-ray beam is such that the magnet would be hit, by adjusting the collimator in the at least one configuration, it can be achieved that the beam width is adjusted and an impact is prevented. In addition, there is no need to provide space that would allow manual replacement of collimators. Also preferred, the magnet is outside of a beam path of the X-ray beam in each configuration of the adjustable collimator.

Further preferred, the collimator is configured to continuously adjust a beam width of the X-ray beam between a maximum value and a minimum value. Accordingly, the beam width can be adjusted precisely so that the magnet is just not struck. At the same time, however, the X-ray beam width does not have to be restricted to too great an extent, so that the sample is still sufficiently irradiated. Thus, an ideal compromise between irradiation of the sample and prevention of irradiation of the magnet is made possible. In addition, difficulty in manually replacing collimators arises with portable devices due to the limited installation space. This is exacerbated by the additional restricted space due to the magnet. This preferred collimator design provides an adjustable collimator that addresses and counteracts this problem by eliminating the need for replacement while still allowing adjustment of the X-ray beam.

According to another preferred embodiment, the collimator is displaceable, preferably along the first axis, within the radiation source assembly and the beam width of the X-ray beam depends on the position of the collimator. This can also be referred to as a "flashlight solution". By moving the collimator, the distance between the collimator and the radiation source or between the collimator and the first aperture is varied. Accordingly, the distance covered by the X-ray beam is increased or decreased, as is the angle at which the X-ray beam enters or leaves the collimator. This provides a further possibility to continuously vary the path of the X-ray beam, its width and its course. This makes it possible to control it so that it does not hit the magnet. In addition, there is no need to provide space that would allow manual replacement of collimators.

According to a second preferred embodiment, a layer configured to absorb a second XRF radiation emitted from the magnet in response to stray X-ray beams or stray first XRF radiation is disposed on the magnet. Due to stray radiation, despite the preferred arrangement and other previously mentioned embodiments, photoelectrons may be generated by the stray radiation reaching the magnet. However, the associated second XRF radiation is absorbed due to the layer. Both photons from the excitation channel, the X-ray beam, and the first XRF radiation can thus affect the detected signal when they hit the magnet. However, the layer absorbs this second XRF radiation, so that the measurement is still largely unaffected. Due to the additional layer, the originally interfering second XRF signal is attenuated to vanishingly low intensities.

Further preferred, a plurality of layers is disposed on the magnet, each of the plurality of layers being configured to absorb other XRF radiation emitted from an adjacent other layer of the plurality of layers disposed closer to the magnet in response to stray X-ray beam or stray first and/or other XRF radiation. It may occur that the weakening of the second XRF signal, however, is "bought in" by an additional signal based on an additional layer. In other words, an additional layer weakens the magnet signal but could cause its own. By successive layer construction, a layer sequence of several layers can be created, which are coordinated with each other. One layer, for example, is able to attenuate the second XRF signal, whereas another layer, for example, is not able to attenuate the second XRF signal, but the signal of the one layer. Accordingly, this design ensures that all interfering radiation from layers is absorbed and only a signal remains that does not interfere, is sufficiently attenuated or cannot be measured with the present method.

Preferably, at least one layer comprises non-magnetizable materials.

In a preferred embodiment of the second preferred embodiment, a layer of the plurality of layers disposed closer to the magnet comprises elements whose atomic number is greater than another layer of the plurality of layers disposed further from the magnet. Heavier elements have a greater mass attenuation coefficient μ than lighter elements. The mass attenuation coefficient is the quotient of the absorption coefficient and the density of the respective material. The attenuation can be described using Lambert-Beer's law, which defines the attenuation of the intensity of a radiation in relation to its initial intensity when passing through a medium with an absorbing substance as a function of the concentration of the absorbing substance and the layer thickness.

According to another preferred embodiment, an outer layer is carbon-based and preferably comprises parylene. The parylene does not have a disruptive effect on the measurement process because it consists only of light elements whose fluorescence is so low-energy that it is not detected and therefore does not interfere.

According to a further preferred embodiment, the plurality of layers comprises a layer sequence of aluminum, titanium and copper in said order starting from the magnet. It could be found out by the inventors that this sequence of layers improves the signal to be measured or reduces interfering factors. First of all, the titanium layer can significantly weaken the intensity of the signal attributable to the magnet. This is accompanied by a signal, which is due to the titanium layer. However, its influence can be reduced by the further aluminum layer. Finally, the copper layer ensures that the signal associated with the aluminum layer is also significantly weakened. Thus, a precise and clean signal can be obtained even from X-ray beams impinging on the magnet or scattered radiation from it.

According to a third preferred embodiment, the magnet is disposed such that an angle between a main component of its magnetic field and the first axis and/or the second axis is greater than 0°, preferably greater than 25°, more preferably greater than 45° and particularly preferred is 90°. In other words, the principal component, which can be considered as the line connecting the magnetic north and the magnetic south of the magnet, intersects the first and/or second axis at said angles. In other words the magnet is disposed such that a main direction of magnetic field lines and the first and/or the second axis are skewed, oblique or non-parallel to each other. It should be noted here that a magnet such as a bar magnet has a three-dimensional magnetic field.

Accordingly, the magnetic field of a magnet has an infinite number of field lines. According to a first variant of the third preferred embodiment, the principal component is the region of the magnetic field which is locally located outside the magnet and between its poles. The angle is between the intersection of the corresponding axis and a tangent applied to the magnetic field at this intersection. Preferably, the magnet is a bar magnet. According to this variant, the magnet is then necessarily arranged closer to one of the radiation source assembly or the radiation detector assembly and has a smaller distance to it than to the other of these two components. Particularly preferably the magnet is arranged closer to the radiation detector assembly, since then in particular there an arrival of electrons is prevented. In this case, the magnet is preferably arranged in such a way that the longest axis of symmetry is arranged orthogonally to the second axis and/or a projection of the second axis onto the magnet lies midway between its two poles. According to a second variant of the third preferred embodiment, the main component is the region of the magnetic field which is located locally outside the magnet and outside its poles. Accordingly, one of the two magnetic poles is located closer to the radiation source assembly and the radiation detector assembly than the other pole. Particularly preferably the magnet is arranged closer to the radiation detector assembly, since then in particular there an arrival of electrons is prevented. Here, the magnet is preferably arranged in such a way that the longest axis of symmetry is arranged orthogonally to the second axis and/or a projection of the second axis onto the magnet lies on an outer surface of the magnet forming this pole.

According to another aspect of the present disclosure, a method for elemental analysis with a handheld XRF analyzer is provided. The handheld XRF analyzer comprises a radiation source assembly configured to irradiate a sample to be tested with an X-ray beam, a radiation detector assembly configured to detect a first XRF radiation emitted from the sample in response to the X-ray beam, a purge assembly configured for purging through a port connection, a magnet configured to deflect electrons and a processor configured to determine a property of the sample to be tested from the detected first XRF radiation. The method comprises the steps of generating the X-ray beam with the radiation source and collimating the generated X-ray beam by means of the collimator and afterwards emitting the collimated X-ray beam from one end of the handheld XRF instrument and irradiating the sample with the emitted X-ray beam. Then the first XRF radiation emitted from the sample in response to the X-ray beam with the radiation detector assembly is received and a property of the sample from which the first XRF radiation is emitted based on a measured amount of energy from the first XRF is determined with the processor. Thereby electrons within the handheld XRF analyzer are deflected by the magnet such that they do not reach the radiation detector assembly, wherein the deflecting comprises generating a magnetic field according to the preferred embodiment.

BRIEF DESCRIPTION OF THE DRAWINGS

Features will become apparent to those of ordinary skill in the art by describing in detail exemplary embodiments with reference to the attached drawings in which.

Figure 1A:
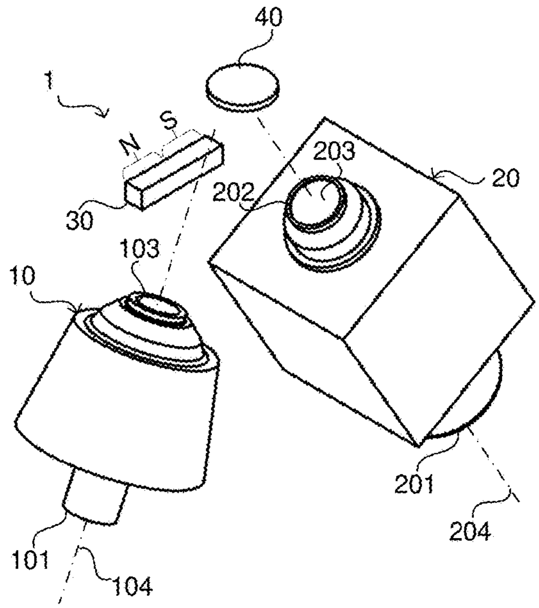
FIG. 1*a* illustrates a perspective view of a handheld X-ray fluorescence, XRF, analyzer according to a first embodiment.

The invention is defined by the appended claims. The description that follows is subjected to the limitation. Any disclosure lying outside the scope of said claims is only intended for illustrative as well as comparative purposes.

Accordingly, processes, elements, and techniques that are not considered necessary to those having ordinary skill in the art for a complete understanding of the aspects and features of the present disclosure may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items. Expressions such as "at least one of," when preceding a list of elements, modify the entire list of elements and do not modify the individual elements of the list.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a film, a region, or an element is referred to as being "above" or "on" another film, region, or element, it can be directly on the other film, region, or element, or intervening films, regions, or elements may also be present.

In the following description of embodiments of the present disclosure, the terms of a singular form may include plural forms unless the context clearly indicates otherwise.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallizations and/or pins, and/or may comprise conductive polymers or ceramics. Further electrical energy might be transmitted via wireless connections, e.g. using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

SPECIFIC EMBODIMENTS

Figure 1B:
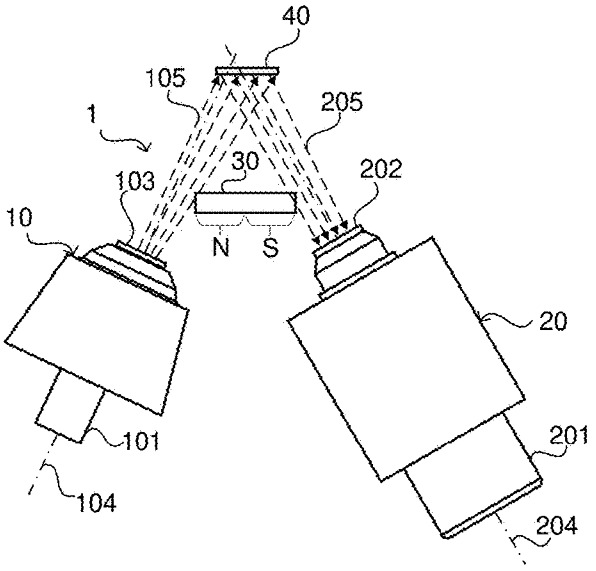
FIG. 1*b* illustrates a side view of the handheld XRF analyzer from FIG. 1*a*.

FIG. 1*a* is a perspective view illustrating a handheld X-ray fluorescence, XRF, analyzer 1 according to a first embodiment. FIG. 1*b* is a side view illustrating the handheld XRF analyzer 1 from FIG. 1*a*. The handheld XRF analyzer 1 shown includes a radiation source assembly 10. The radiation source assembly 10 includes an X-ray tube 101 disposed within a housing. Further, the radiation source assembly 10 includes a first aperture 103 for an X-ray beam 105. A first axis 104, presently corresponding to the center axis of the housing as well as the X-ray tube 101 of the radiation source assembly 10, extends within the housing and extends through the first opening 103 at the center thereof. Further, the XRF analyzer 1 includes a radiation detector assembly 20. The radiation detector assembly 20 includes a housing in which a silicon drift detector, SDD, 201 and a second aperture 202 for first XRF radiation 205 are disposed. A second axis 204, corresponding to the center axis of the housing and the silicon drift detector 201 of the radiation detector assembly 20, extends within the housing and extends through the second aperture 202 at the center thereof. The handheld XRF analyzer 1 further comprises a purge assembly configured for purging through a port connection and a processor configured to determine a property of the sample to be tested from first XRF radiation 205, neither component being shown herein. Above the radiation source assembly 10 and the radiation detector assembly 20 and spaced apart from both a magnet 30, preferably a neodymium magnet 30, is disposed. The magnet 30 is laterally spaced apart from the first axis 104 and the second axis 204. Further above, the sample 40 is disposed. The sample 40 is arranged outside the housing of the handheld XRF analyzer 1, which is not shown, preferably on a sample support surface of the handheld XRF analyzer 1. The X-ray beam 105 is created by the X-ray tube 101 inside the handheld analyzer 1. The X-ray beam 105 is then emitted through the first aperture 103. Interaction of the X-ray beam 105 with the sample 40 generates first XRF radiation 205. The first XRF radiation 205 enters the radiation detector assembly 20 through the second aperture 202 and strikes the silicon drift detector 201. Furthermore, an alignment of magnetic north pole N and magnetic south pole S of the magnet 30 is shown as an example.

Figure 1C:
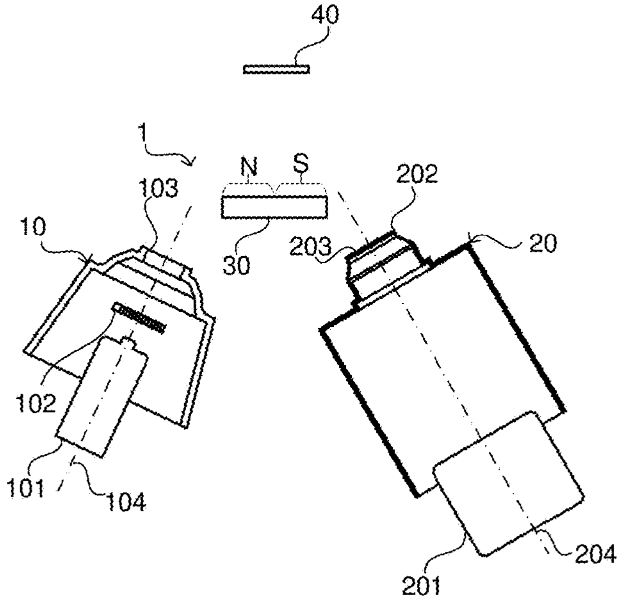
FIG. 1*c* illustrates a sectional view of the handheld XRF analyzer from FIG. 1*a*.

FIG. 1*c* is a sectional view illustrating the handheld XRF analyzer 1 from FIG. 1*a*. In addition to the components and features already described with respect to FIGS. 1*a* and 1*b*, the collimator 102 schematically shown disposed within the housing of the radiation source assembly 10 can also be seen here based on the sectional view.

Figure 1D:
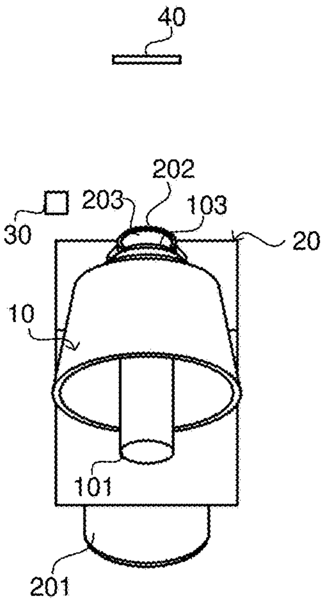
FIG. 1*d* illustrates a front view of the handheld XRF analyzer of FIG. 1*a*.

FIG. 1*d* is a front view illustrating the handheld XRF analyzer 1 of FIG. 1*a*. Further shown in FIGS. 1*a*, 1*c* and 1*d* is the arrangement of a light element window 203, preferably a graphene window 203, within the second opening 202.

Figure 1E:
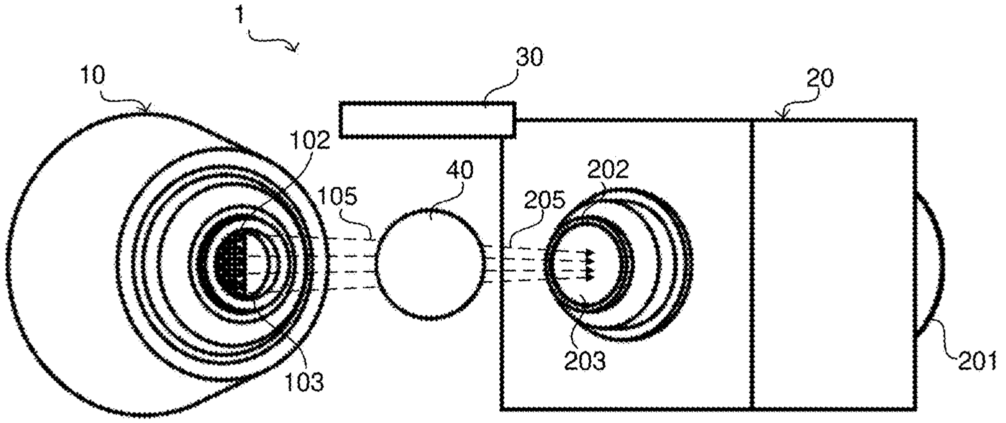
FIG. 1*e* illustrates a top view of the handheld XRF analyzer of FIG. 1*a*.

FIG. 1*e* illustrates a top view of the handheld XRF analyzer 1 of FIG. 1*a*. FIGS. 1*b* and 1*e* schematically show a beam path of the X-ray beam 105 and a beam path of the first X-ray radiation 205. The X-ray beam 105 is generated by the X-ray tube 101 and then passes through the housing of the radiation source assembly 10 and the collimator 102 disposed within the housing. The X-ray beam 105 passes through the first opening 103 and hits the sample 40. The interaction with the sample 40 generates the first XRF radiation 205, which then passes from the sample 40 towards the radiation detector assembly 20. The first XRF radiation 205 passes through the graphene window 203 disposed in the second aperture 202 and then reaches the silicon drift detector 201.

Figure 2:
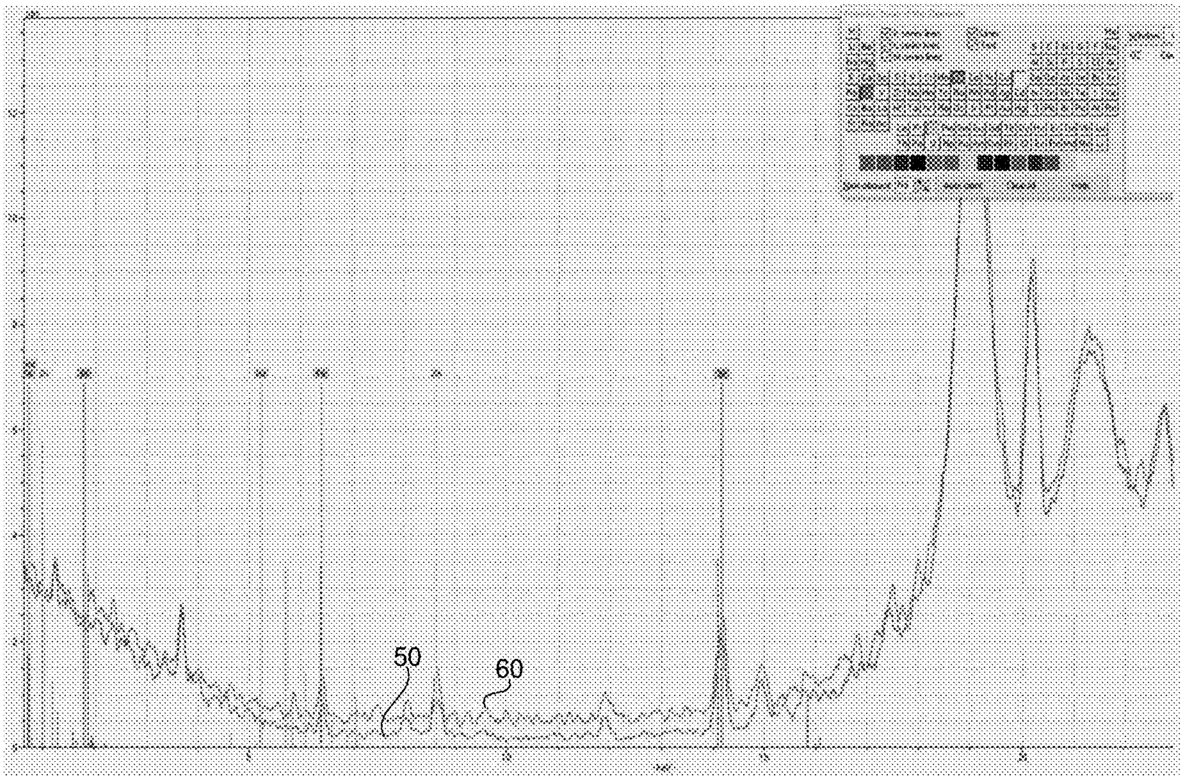
FIG. 2 illustrates an X-ray spectrum based on using a device according to the invention and based on using a device according to the prior.

FIG. 2 illustrates an X-ray spectrum based on using a device according to the invention 50 and based on using a device according to the prior art 60. For example, the device according to the invention used is the device illustrated in FIG. 1*a*. The placement of the magnet 30 according to the invention, preferably neodymium, deflects electrons emitted from the sample 40 so that they do not reach the silicon drift detector 201 inside of the radiation detector assembly 20. The result is shown by way of example in FIG. 2. There, an X-ray spectrum is imaged based on using a device according to the invention 50 and based on using a device according to the prior art 60 in photon energy imaging There, counts per second are plotted against photon energy in kiloelectron volts (keV). Counts per second, or cps for short, is a unit of measurement for the count rate (the average repetition rate of measurement signals counted as time-separated individual events). An event in this sense is the registration of a photon, electron, or other particle by a particle detector. The unit is commonly used in atomic and nuclear physics and in many applications, e.g. X-ray induced photoelectron spectroscopy (XPS) and auger electron spectroscopy (AES) as well as in nuclear medicine. It has been shown by the inventors in experiments and studies that the placement of the magnet 30 reduces a higher background in the characteristic X-ray spectrum caused by the photoelectrons that can reach the detector 201, which are present under the given conditions. The arrangement of the magnet 30 does not add artificial peaks that would disturb the spectrum.

Figure 3A:
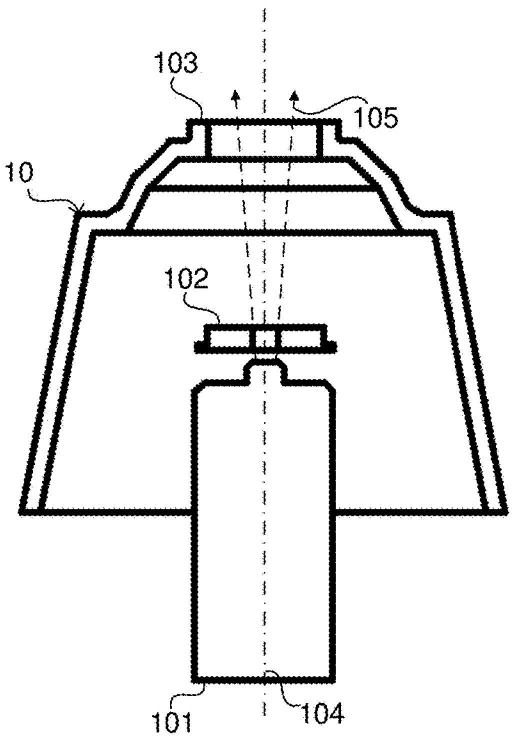
FIG. 3*a*, 3*b* illustrates a sectional view of a radiation source assembly of a handheld XRF analyzer according to a second embodiment.
Figure 3B:
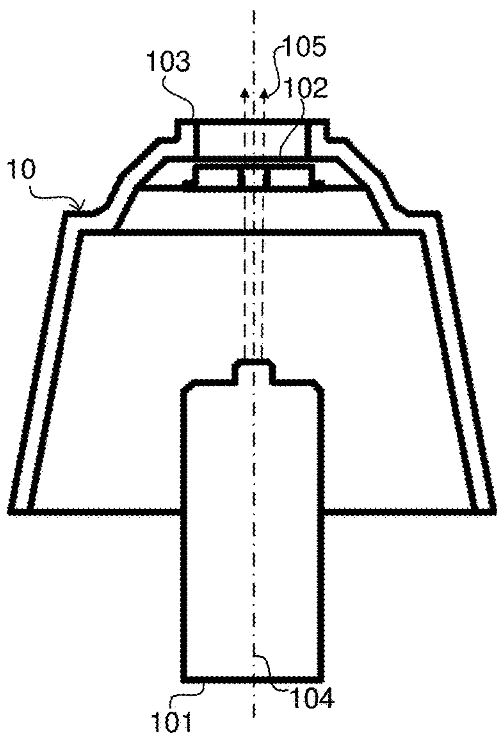
Figure 3C:
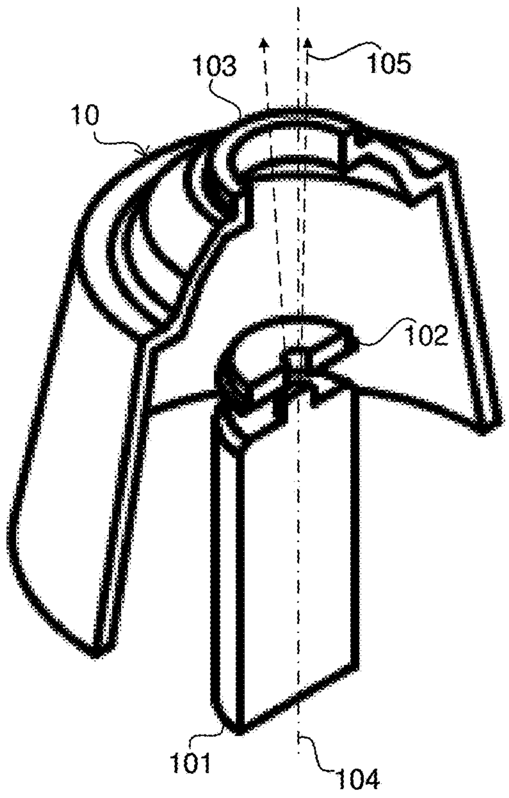
FIG. 3*c*, 3*d* illustrates a perspective, sectional view of the radiation source assembly of the handheld XRF analyzer of FIG. 3*a*, 3*b*.
Figure 3D:
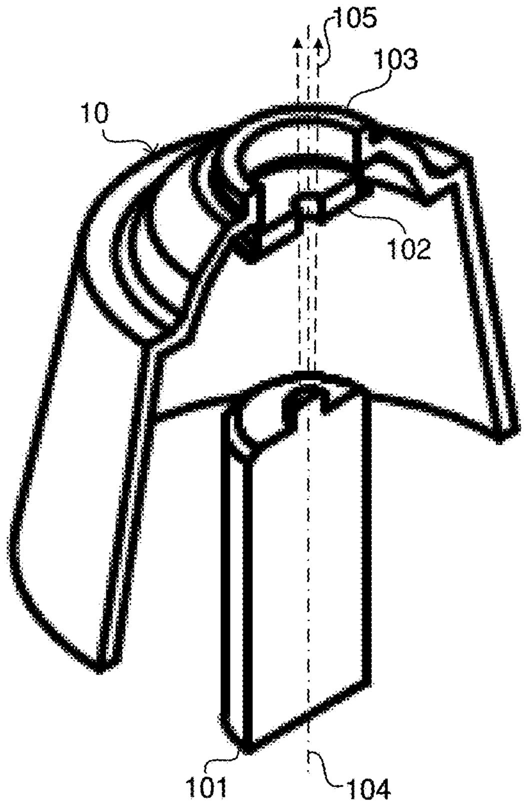

In FIGS. 3*a* to 3*d*, a radiation source assembly 10 of a handheld XRF analyzer 1 according to a second embodiment is shown. Here, in FIGS. 3*a* and 3*b* is shown a sectional view of the radiation source assembly 10 of the handheld XRF analyzer 1. In FIGS. 3*c* and 3*d* is shown a perspective, sectional view of the radiation source assembly 10 of the handheld XRF analyzer 1 of FIGS. 3*a* and 3*b*.

The radiation source assembly 10 comprises a collimator 102 that is configured to continuously adjust a beam width of the X-ray beam 105 between a maximum value and a minimum value. The collimator 102 is displaceable along the first axis 104, within the radiation detector assembly 10 and the beam width of the X-ray beam 105 depends on a position of the collimator 102. FIGS. 3*a* and 3*c* show a configuration in which the collimator 102 is disposed close to the X-ray tube 101. This forms an X-ray beam 105 with a first beam width at the exit of the radiation source assembly 10. Thus, the X-ray beam 105 emerges from the first aperture 103 with a first beam width and thereafter strikes the sample 40 with a corresponding first spot size. In contrast, FIGS. 3*b* and 3*d* depict a configuration in which the collimator 102 is disposed close to the first aperture 103. As a result, the X-ray beam 105 has a second beam width at the exit of the radiation source assembly 10. Thus, the X-ray beam 105 exits the first aperture 103 with a second beam width and thereafter strikes the sample 40 with a corresponding second spot size. The first beam width according to the first configuration of the collimator 102 illustrated in FIGS. 3*a* and 3*c* is greater than the second beam width according to the second configuration of the collimator 102 illustrated in FIGS. 3*b* and 3*d*.

The diagrams illustrated in FIGS. 4*b*, 5*b*, 50, 6*b*, 6*c* and 7*b* show a situation in which photons originating from the radiation source assembly or the radiation detector assembly strike the magnet 30 or a layer 31, 32, 33, respectively, so that a signal with a corresponding percentage is then obtained per incident photon. Since these signals are due to the magnet 30 or layers 31, 32, 33 and not to the sample 40, they represent interfering signals that are undesirable.

As an example, the L-alpha transition line of Neodymium is shown (La=L-alpha) as a potential magnet material.

Figure 4A:
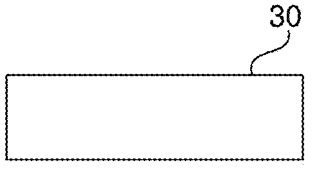
FIG. 4*a* illustrates a schematic view of a magnet.
Figure 4B:
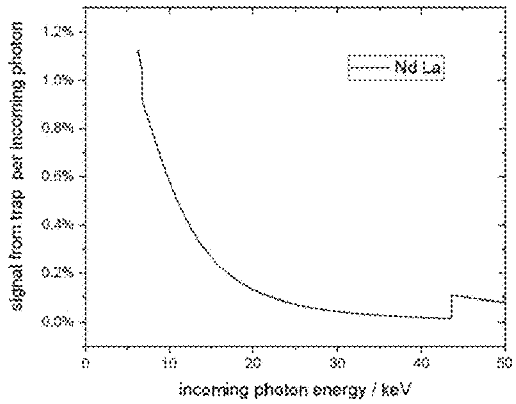
FIG. 4*b* illustrates an X-ray spectrum of the magnet of FIG. 4*a*.

FIG. 4*a* shows a neodymium magnet 30 without coating. The corresponding diagram in FIG. 4*b* therefore shows a signal in the percentage range that can be measured above the magnet 30.

Figure 5B:
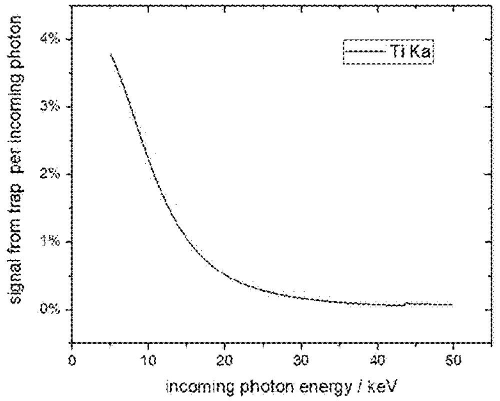
FIG. 5*b* illustrates an X-ray spectrum of the first layer of FIG. 5*a*.
Figure 5A:
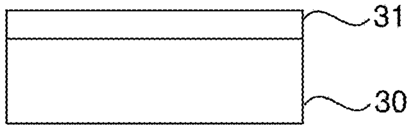
FIG. 5*a* illustrates a schematic view of the magnet of FIG. 4*a* and a first layer.
Figure 5C:
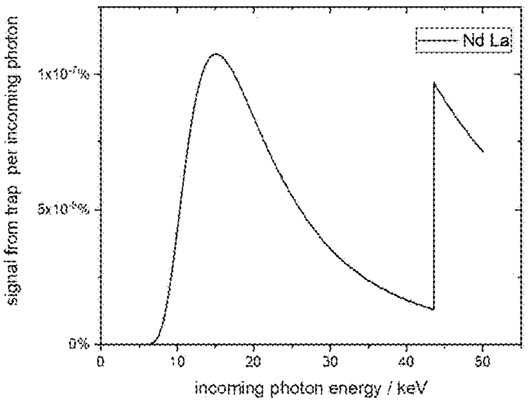
FIG. 5*c* illustrates an X-ray spectrum of the magnet of FIG. 5*a*.

In FIG. 5*a*, a magnet 30 is now provided on which a first coating 31, preferably with a thickness of 50 μm, is disposed. Preferably, this is a coating comprising titanium. The neodymium magnet L-alpha signal previously shown in FIG. 4*b* now exhibits only vanishingly low intensities as shown in FIG. 5*c*. Accordingly, the measurable signal based on the magnet 30 above the magnet 30 could be considerably weakened and hardly influences the measurement result anymore. However, a titanium K-alpha signal still results as shown in FIG. 5*b*.

Figure 6A:
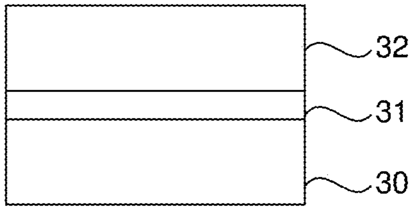
FIG. 6*a* illustrates a schematic view of the magnet of FIG. 4*a*, the first layer of FIG. 5*a* and a second layer.
Figure 6B:
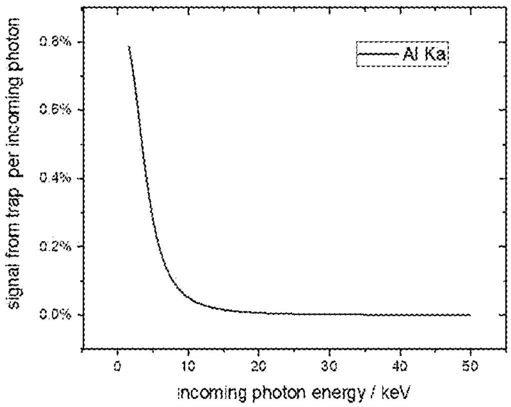
FIG. 6*b* illustrates an X-ray spectrum of the second layer of FIG. 6*a*.
Figure 6C:
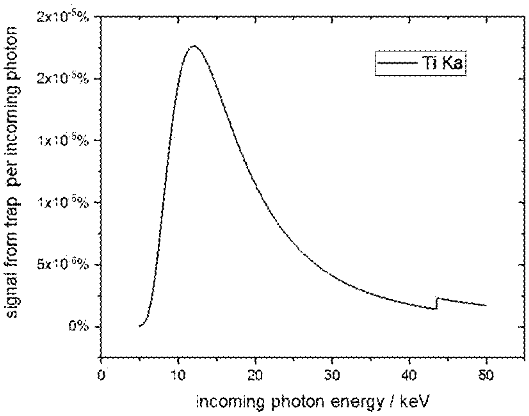
FIG. 6*c* illustrates an X-ray spectrum of the first layer of FIG. 6*a*.

The overall coating is further supplemented to provide a neodymium magnet 30 comprising the first coating 31 and a further, second coating 32 disposed on the first coating 31. This is illustrated in FIG. 6*a*. Preferably, the second coating 32 comprises aluminum and preferably has a thickness of 150 μm. The titanium K-alpha signal previously shown in FIG. 5*b* now exhibits only vanishingly low intensities as shown in FIG. 6*c*. Accordingly, both measurable signals above the magnet 30 due to the magnet 30 as well as to the first coating 31 could be considerably weakened and hardly influence the measurement result anymore. However, an aluminum K-alpha signal still results as shown in FIG. 6*b*.

Figure 7A:
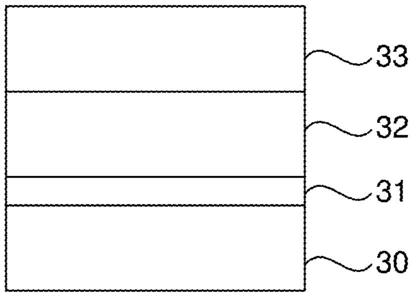
FIG. 7*a* illustrates a schematic view of the magnet of FIG. 4*a*, the first layer of FIG. 5*a*, the second layer of FIG. 6*a* and a third layer.
Figure 7B:
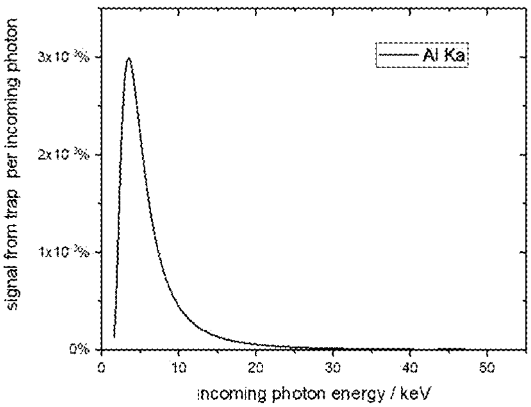
FIG. 7*b* illustrates an X-ray spectrum of the third layer of FIG. 7*a*.

The overall coating is further supplemented to provide a neodymium magnet 30 comprising the first coating 31, the second coating 32, and a further, third coating 33 disposed on the second coating 32. This is shown in FIG. 7*a*. Preferably, the third coating 33 is carbon-based, and particularly preferably comprises parylene, and preferably has a thickness of 150 μm. The aluminum K-alpha signal previously shown in FIG. 6*b* now exhibits only vanishingly low intensities as shown in FIG. 7*b*. Accordingly, the three measurable signals above the magnet 30 on the magnet as well as on the first coating 31 and on the second coating 32 could be considerably weakened and hardly influence the measurement result anymore. The third coating 33, which is hydrocarbon-based in the present case, includes elements that are not seen during XRF. Accordingly, signals that may result from stray radiation and the like could be successively attenuated to such an extent that they do not interfere with the measurement procedure.

REFERENCE SIGNS

1 handheld X-ray fluorescence, XRF, analyzer
10 radiation source assembly
101 X-ray source/X-ray tube
102 collimator
103 first aperture
104 first axis
105 X-ray beam
20 radiation detector assembly
201 silicon drift detector, SDD
202 second aperture
203 light element window/graphene window
204 second axis
205 first XRF radiation
30 magnet/neodymium magnet
31 first layer
32 second layer
33 third layer
40 sample
50 X-ray spectrum according to the invention
60 X-ray spectrum according to the prior art
N magnetic north pole
S magnetic south pole

What is claimed is:

1. A handheld XRF (X-ray fluorescence) analyzer comprising:
- a radiation source assembly configured to irradiate a sample to be tested with an X-ray beam;
- a radiation detector assembly configured to detect a first X-Ray fluorescence, XRF, radiation emitted from the sample in response to the X-ray beam;
- a purge assembly configured for purging through a port connection;
- a magnet configured to deflect electrons such that they do not reach the radiation detector assembly; and
- a processor configured to determine a property of the sample to be tested from the first XRF radiation.

2. The handheld XRF analyzer of claim 1, wherein the magnet is disposed outside of a beam path of the X-ray beam and outside of a beam path of the first XRF radiation.

3. The handheld XRF analyzer according to claim 1, wherein the radiation source assembly comprises an X-ray source, a collimator, and a first aperture for the X-ray beam.

4. The handheld XRF analyzer of claim 3, wherein the X-ray source, the collimator, and the first aperture are disposed along a first axis in said order and wherein the magnet is laterally spaced apart from the first axis.

5. The handheld XRF analyzer according to claim 1, wherein the radiation detector assembly comprises a silicon drift detector, SDD, and a second aperture for the first XRF radiation in which a light element window is disposed.

6. The handheld XRF analyzer according to claim 5, wherein the SDD and the second aperture are disposed along a second axis in said order, and wherein the magnet is laterally spaced apart from the second axis.

7. The handheld XRF analyzer of claim 3, wherein the collimator is adjustable to alter a beam width of the X-ray beam, and wherein the magnet is outside of a beam path of the X-ray beam in at least one configuration of the adjustable collimator.

8. The handheld XRF analyzer according to claim 3, wherein the collimator is configured to continuously adjust a beam width of the X-ray beam between a maximum value and a minimum value.

9. The handheld XRF analyzer of claim 8, wherein the collimator is displaceable within the radiation source assembly, and the beam width of the X-ray beam depends on a position of the collimator.

10. The handheld XRF analyzer according to claim 1, wherein a layer configured to absorb a second XRF radiation emitted from the magnet in response to stray X-ray beams or stray first XRF radiation is disposed on the magnet.

11. The handheld XRF analyzer according to claim 1, wherein a plurality of layers is disposed on the magnet, each of the plurality of layers being configured to absorb other XRF radiation emitted from an adjacent other layer of the plurality of layers disposed closer to the magnet in response to stray X-ray beam or stray first and/or other XRF radiation.

12. The handheld XRF analyzer according to claim 10, wherein at least one layer comprises non-magnetizable materials.

13. The handheld XRF analyzer according to claim 11, wherein a layer of the plurality of layers disposed closer to the magnet comprises elements whose atomic number is greater than another layer of the plurality of layers disposed further from the magnet.

14. The handheld XRF analyzer according to claim 10, wherein an outer layer is carbon-based.

15. The handheld XRF analyzer according to claim 11, wherein the plurality of layers comprises a layer sequence of aluminum, titanium and parylene in said order starting from the magnet.

16. The handheld XRF analyzer according to claim 4, wherein the magnet is disposed such that an angle between a main component of its magnetic field and the first axis is greater than 0°.

17. The handheld XRF analyzer according to claim 6, wherein the magnet is disposed such that an angle between a main component of its magnetic field and the second axis is greater than 0°.

18. The handheld XRF analyzer according to claim 14, wherein the carbon-based outer layer comprises parylene.

19. The handheld XRF analyzer according to claim 16 wherein the angle is greater than 25°.

20. A method for elemental analysis with the handheld XRF analyzer of claim 1, wherein the method comprises the steps of:

generating the X-ray beam with the radiation source assembly and collimating the generated X-ray beam by means of the collimator;

emitting the collimated X-ray beam from one end of the handheld XRF instrument and irradiating the sample with the emitted X-ray beam;

receiving the first XRF radiation emitted from the sample in response to the X-ray beam with the radiation detector assembly; and determining a property of the sample from which the first XRF radiation is emitted based on a measured amount of energy from the first XRF with the processor, wherein electrons within the handheld XRF analyzer are deflected by the magnet such that they do not reach the radiation detector assembly, wherein the deflecting comprises generating a magnetic field.

* * * * *